(12) United States Patent
McCune, Jr.

(10) Patent No.: US 9,520,781 B2
(45) Date of Patent: Dec. 13, 2016

(54) RAPID-TRANSITION DC-DC CONVERTER

(71) Applicant: Earl W McCune, Jr., Santa Clara, CA (US)

(72) Inventor: Earl W McCune, Jr., Santa Clara, CA (US)

( * ) Notice: Subject to any disclaimer, the term of this patent is extended or adjusted under 35 U.S.C. 154(b) by 837 days.

(21) Appl. No.: 13/650,021

(22) Filed: Oct. 11, 2012

(65) Prior Publication Data

US 2014/0103889 A1    Apr. 17, 2014

(51) Int. Cl.
G05F 1/46 (2006.01)
H02M 3/158 (2006.01)
H02M 3/156 (2006.01)

(52) U.S. Cl.
CPC ..... H02M 3/158 (2013.01); *H02M 2003/1566* (2013.01)

(58) Field of Classification Search
CPC ...................... H02M 3/158; H02M 2003/1566
USPC .......................................... 323/271, 282–285
See application file for complete search history.

(56) References Cited

U.S. PATENT DOCUMENTS

| | | | | |
|---|---|---|---|---|
| 5,122,724 A * | 6/1992 | Criss | ............................. | 323/282 |
| 6,094,036 A * | 7/2000 | Rampold | ............... | H02H 9/001 323/266 |
| 6,831,447 B1 * | 12/2004 | Wittenberg | ............. | G05F 1/613 323/222 |
| 8,299,773 B2 * | 10/2012 | Jang | ........................ | H02M 1/36 323/222 |
| 2005/0180079 A1 * | 8/2005 | Joseph Gaudreau et al. | ............................. | 361/104 |
| 2010/0026252 A1 * | 2/2010 | Lin | ........................... | G05F 1/56 323/275 |
| 2011/0012554 A1 * | 1/2011 | Lin | ....................... | H02J 7/0052 320/107 |

OTHER PUBLICATIONS

Analog Device, Datasheet for ADP2109, Apr. 2009, Analog Device, Rev.0, 1-16.*

* cited by examiner

*Primary Examiner* — Jue Zhang
(74) *Attorney, Agent, or Firm* — Patent Law Professionals, P.C.; William E. Winters (57) ABSTRACT

A DC-DC converter for delivering electrical power to a load includes an output filter having an inductor and an output capacitor, a first switch, and a second switch. The first switch is configured to alternately couple and decouple the inductor to and from a DC input voltage as power is being delivered to the load. The second switch is configured to electrically disconnect the output capacitor when the load is removed or deactivated. Disconnecting the output capacitor allows the DC-DC converter to rapidly transition from an operating state to a disabled state, obviating any need to discharge the output capacitor in order to fully disable the DC-DC converter. Residual energy stored in the electric field of the output capacitor and/or the magnetic field of the inductor at the time the load is next reactivated is available to hasten transition back to the operating state.

18 Claims, 8 Drawing Sheets

RAPID-TRANSITION DC-DC CONVERTER

FIELD OF THE INVENTION

The present invention relates in general to conserving energy in electrical systems. More particularly, the present invention relates to direct-current to direct current (DC-DC) conversion methods and apparatus that facilitate energy conservation in electrical systems.

BACKGROUND OF THE INVENTION

Electronic devices often contain components having voltage level requirements that are different from the voltage supplied by the electronic device's power supply. For example, the power supply in a modern personal computer typically provides a 12 volt direct current (12 VDC) output voltage but the computer's central processing unit (CPU) requires a much lower voltage, e.g., on the order of 1 VDC. To satisfy the lower voltage level requirement of the CPU, a direct-current to direct-current (DC-DC) converter is employed to step the 12 VDC down to the voltage level required of the CPU.

Figure 1:
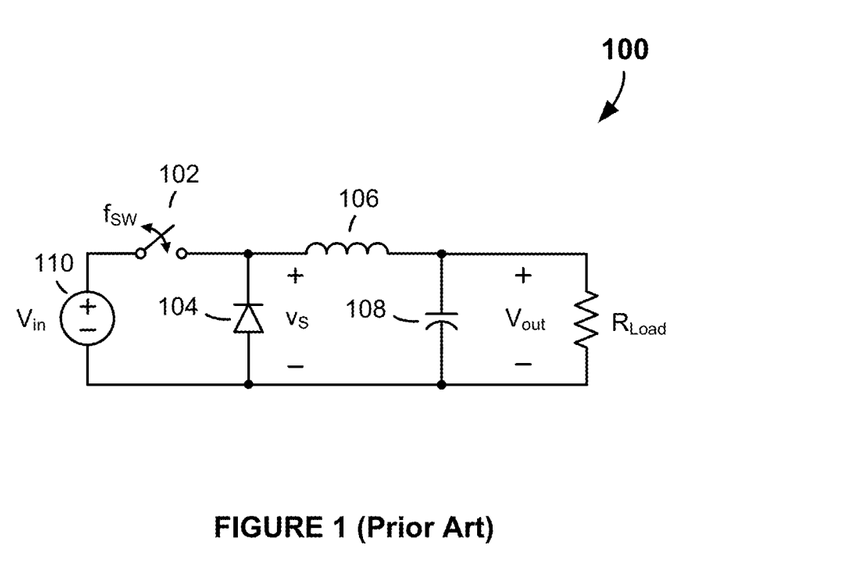
FIG. 1 is a schematic drawing of a conventional switch-mode direct-current to direct-current (DC-DC) converter.

In many applications the DC-DC conversion is implemented using a switch-based DC-DC converter, like the switch-mode DC-DC converter 100 depicted in FIG. 1. The switch-mode DC-DC converter 100 comprises a switch 102, a diode 104, an inductor 106, and a capacitor 108. In stepping down the DC input voltage Vin to a lower DC output voltage Vout, the switch 102 (usually a power transistor) is controlled so that it opens and closes (i.e., turns OFF and ON) at a frequency $f_{SW}$ (typically in the range of 1 kHz to 1 MHz). In effect, the switching action "chops" the input voltage Vin into a voltage $v_S(t)$ having a rectangular waveform of commutation period T and duty cycle D.

For a given period T, the DC component of the chopped-up waveform $v_S(t)$ is equal to the average of the waveform $v_S(t)$ over that same period. In other words, $$DC\ Component = \frac{1}{T}\int_0^T v_S(t)dt = DVin.$$

The DC component is the desired DC output voltage Vout. However, the chopped-up waveform $v_S(t)$ also contains switching harmonics of the switching frequency $f_{SW}$. The inductor 106 and capacitor 108 together comprise a low-pass filter that filters out the switching harmonics, so that only the desired DC output voltage Vout is passed to the output. The corner frequency of the low-pass filter is proportional to $1/\sqrt{LC}$. Accordingly, to be most effective at filtering out all switching harmonics and allow only the DC component to pass to the output, the corner frequency should be made as low as possible. This requires a high inductance inductor 106, a high capacitance capacitor 108, or both.

In some applications the load to which the switch-mode DC-DC converter 100 supplies power can change abruptly from an active state in which the load is performing a desired and useful function to an inactive state in which the load is not performing any useful function (or is only performing some lower rank function). One example of this is a computer configured as a server in a data center (i.e., "server farm"). In such an application the computer/server can draw 100 watts or more of power when active and computing but need only a fraction of that power (e.g., 100 or 1,000 times less) when inactive. To conserve energy, it would be desirable to supply power to the CPU only when the CPU is active and computing. Unfortunately, this is not possible when a conventional switch-mode DC-DC converter (like the conventional switch-mode DC-DC converter 100 in FIG. 1) is being used. The problem is that in data center applications CPUs transition between active and inactive states in very short times—on the order of nanoseconds. However, it can take milliseconds for the switch-mode DC-DC converter 100 to transition across the power supply range corresponding to the active and inactive states. Much of the required transition time is dedicated to charging and discharging the output low-pass filter (inductor 106/capacitor 108). The transition time could be shortened by reducing the values of the inductor 106 and capacitor 108. However, that would interfere with the ability to provide a flat and well-controlled DC output voltage Vout. Power to servers/computers in data centers is therefore usually always left on, even during periods of inactivity when the CPUs are not computing. This undesirably results in significant amounts of power being wasted during inactive periods. The amount of wasted power can be substantial, especially when all computers/servers in the data center are accounted for. Not only does the wasted power translate into higher energy costs for data center purveyors, it also contributes to excessive loading of the power grid, pollution, and harm to the environment.

BRIEF SUMMARY OF THE INVENTION

Direct-current to direct-current (DC-DC) power conversion methods and apparatuses are disclosed. An exemplary switch-mode DC-DC converter includes a first switch, a second switch, an output filter having an inductor and output capacitor, and an optional third switch. When the switch-mode DC-DC converter is in an operating state, the second switch is closed and the first switch is configured to alternately couple and decouple the inductor of the output filter to and from a DC input voltage provided by a source power supply, allowing power to be delivered to a load. Disabling the DC-DC converter is initiated in response to a detected large and abrupt decrease in load current demand, based on an expected or planned large and abrupt decrease in load current demand, or on command and independent of any detected, expected or planned change in load current demand. As the DC-DC converter is disabled, the first switch is opened to decouple the output filter from the source power supply and the second switch is opened to electrically disconnect the output capacitor of the output filter from the rest of the DC-DC converter. Opening the first switch electrically isolates the output filter from the source power supply. Opening the second switch obviates the need to discharge the output capacitor in order to disable the DC-DC converter, allowing the DC-DC converter to rapidly transition to the disabled state. Further, residual energy stored in the electric field of the output capacitor and/or the magnetic field of the inductor at the time the load is next reactivated is available to hasten the transition back to the operating state. The ability of the switch-mode DC-DC converter to rapidly transition between operating and disabled states therefore helps to avoid the problem of power being wasted during periods of load inactivity. Similar techniques for hastening transition times between operating and disabled states may be applied in non-switch-based DC-DC converters, e.g., linear regulators. The optional third switch is connected across the inductor and is employed to divert current away from the load and through the inductor as the DC-DC converter is being disabled and power delivery to the load is removed. Diverting the current and directing it to loop through the inductor prevents large voltage transients from developing and dropping across the load as the DC-DC converter is disabled.

Further features and advantages of the invention, including descriptions of the structure and operation of the above-summarized and other embodiments of the invention, will now be described in detail with respect to accompanying drawings, in which like reference numbers are used to indicate identical or functionally similar elements.

DETAILED DESCRIPTION

Figure 2A:
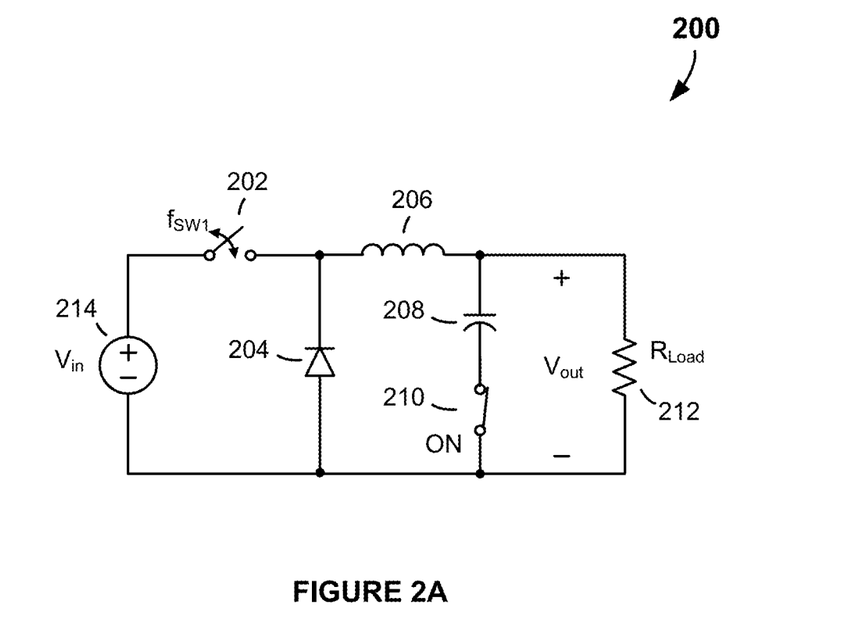
FIGS. 2A and 2B are schematic drawings of a switch-mode DC-DC converter configured in an operating state and disabled state, respectively, according to an embodiment of the invention.
Figure 2B:
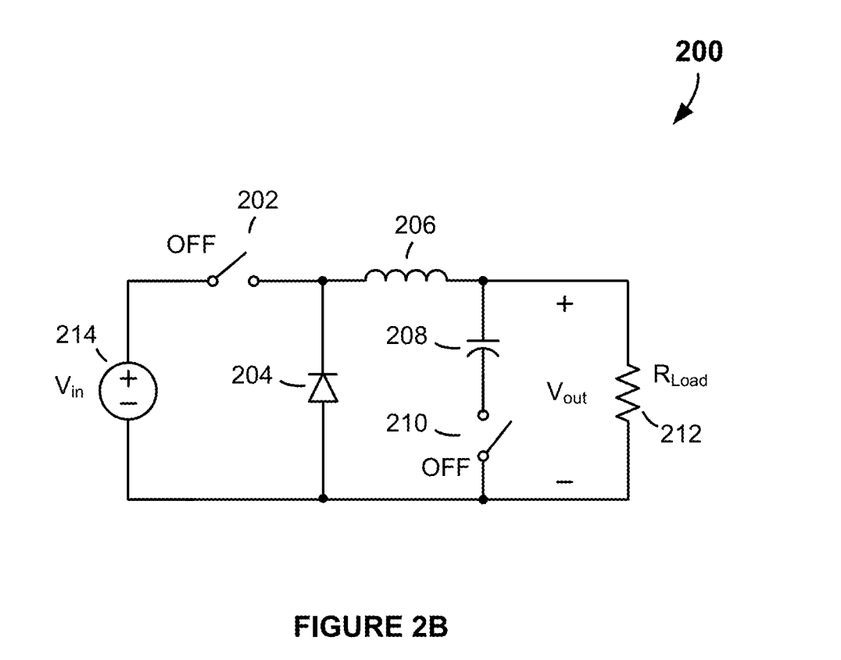

Referring to FIGS. 2A and 2B, there are shown schematic drawings of a switch-mode mode direct-current to direct-current (DC-DC) converter 200, according to an embodiment of the present invention. The switch-mode DC-DC converter 200, which is depicted in an operating state in FIG. 2A and in a disabled state in FIG. 2B, comprises a first switch 202 (e.g., a power transistor), a diode (alternatively, a power transistor) 204, an inductor 206, an output capacitor 208, and a second switch 210.

When configured in the operating state (FIG. 2A), the switch-mode DC-DC converter 200 operates to step down a DC input voltage Vin provided by a DC input power supply 214 to a DC output voltage Vout. In performing the step-down operation, an external power management control system (not shown) provides switch control signals that cause the first switch 202 to alternately couple and decouple the DC input power supply 214 to and from the inductor 206 at a rate of $f_{SW1}$, while maintaining the second switch 210 in a closed position (i.e., ON). When the second switch 210 is ON, the resistance of the second switch 210 adds to the equivalent series resistance (ESR) of the output capacitor 208. This added resistance is beneficial since it allows a low-ESR capacitor to be used for the output capacitor 208, such as, for example, an inexpensive, multi-layer ceramic capacitor (MLCC). (In conventional switch-mode DC-DC converters, like the prior art DC-DC converter 100 depicted in FIG. 1, the second switch 210 is absent, so a higher-ESR output capacitor 108 is required in order to achieve sufficient phase margin at higher frequencies and maintain system stability.) The added resistance contributed by the second switch 210 is offset by the lower-ESR output capacitor 208, so the total output resistance of the system is not increased over that of the conventional switch-mode DC-DC converter 100. The required ESR of the output capacitor 208 needed to maintain system stability can therefore be lowered over that which would be necessary in a conventional DC-DC converter, but without having to suffer an increase in output ripple. The presence of the second switch 210 also provides flexibility in the design and manufacture of the DC-DC converter 200 since the electrical characteristics (e.g., resistance, ESR and capacitance) of both the output capacitor 208 and the second switch 210 can be selected as necessary to achieve an acceptable trade-off or desired combination of phase margin and output ripple.

The DC-DC converter 200 is configured in the disabled state during times the load 212 is inactive. As shown in FIG. 2B, when in the disabled state, the first switch 202 is maintained in an open position (i.e., is OFF), instead of being alternately opened and closed. The second switch 210 is also maintained in an open position. For the purpose of this disclosure, an "active" load state refers to a load condition in which the load is performing work (e.g., computing, in the case of a CPU load) and an "inactive" load state refers to a load condition in which the load is not performing any work or is merely performing some lower rank function (e.g., such as a non-computing administrative or management function, in the case of a CPU load) and drawing substantially less power.

Depending on the application, the DC-DC converter 200 is configured to transition to the disabled state either in response to a detected large and abrupt decrease in current drawn by the load 212 or according to a planned or expected large and abrupt decrease in current demand of the load 212. In general, a large and abrupt decrease in load current corresponds to a change of the load 212 from an active state to an inactive state and a large and abrupt increase in load current corresponds a change in the load 212 from an inactive state to an active state. (What constitutes a "large and abrupt" decrease in current demand is application-dependent and set during design, as will be appreciated by those of ordinary skill in the art.)

The exemplary DC-DC converter 200 described here is directed to transition to the disabled state depending on a detected, expected or planned decrease in load current demand. It should be mentioned, however, that transition to the disabled state need not be based on load current conditions. For example, in other embodiments of the invention, the DC-DC converter 200 and other DC-DC converters disclosed herein are configured so that they transition to the disabled state in response to some external requirement or desire to halt power delivery to the load, irrespective of any detected, expected or planned decrease in load current.

Figure 3A:
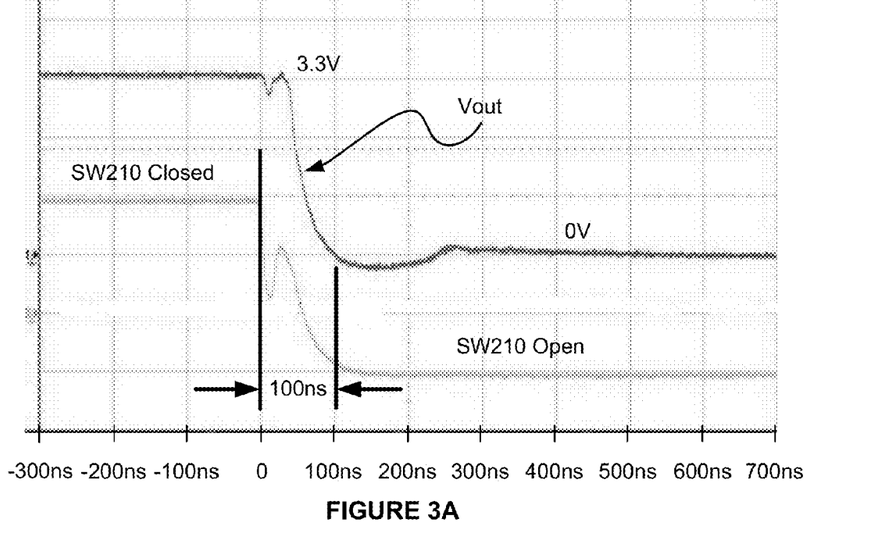
FIGS. 3A and 3B are timing diagrams comparing the turn-off transition time of the DC-DC converter in FIG. 2 to the turn-off transition time of a conventional DC-DC converter.
Figure 3B:
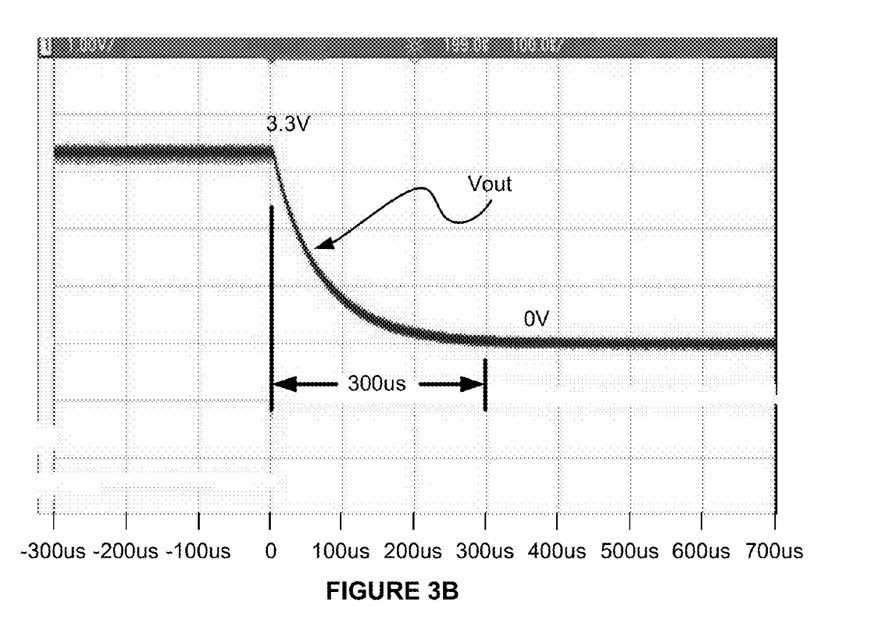

Regardless of what prompts the DC-DC converter 200 to transition to the disabled state, the disabled state is entered by opening the first and second switches 202 and 210. Opening the first switch 202 isolates the output filter (inductor 206 and output capacitor 208) from the DC input power supply 214. Opening the second switch 210 disconnects the output capacitor 208 from the rest of the DC-DC converter circuitry. Accordingly, once the first and second switches 202 and 210 are opened, the switch-mode DC-DC converter 200 is effectively disabled and power delivery to the load 212 is halted. Unlike prior art approaches, energy stored in the output capacitor 208 is not required to fully discharge in order to disable the converter 200. Transition to the disabled state therefore occurs rapidly. The shorter transition time (i.e., turn-off time) of the DC-DC converter 200 compared to conventional DC-DC converters is shown in FIG. 3A. For a 3.3 W test load, the turn-off time is only 100 ns. This is 3,000 times faster than the turn-off transition time (300 μs) measured for a conventional DC-DC converter (FIG. 3B). Moreover, any energy that remains in the electric field of the output capacitor 208 at the time the load 212 is reactivated is available to shorten the transition time of the converter 200 back to the operating state. These rapid-transition attributes make the switch-mode DC-DC converter 200 well-suited for applications involving loads that change between active and inactive states in short times, such as a CPU of a computer/server in a data center, for example.

Figure 4A:
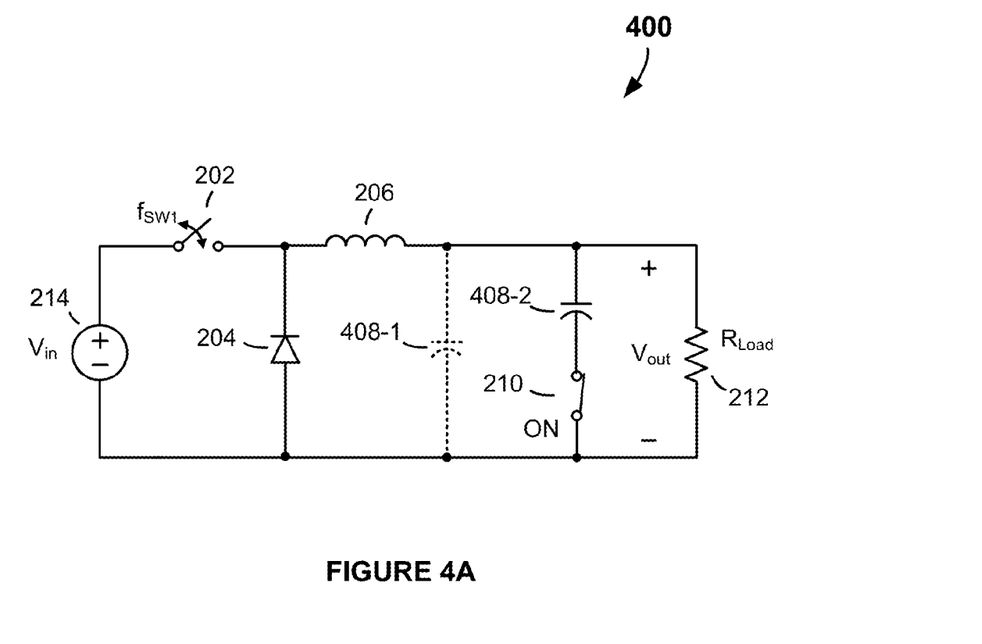
FIGS. 4A and 4B are schematic drawings of a switch-mode DC-DC converter configured in an operating state and disabled state, respectively, according to an embodiment of the invention.
Figure 4B:
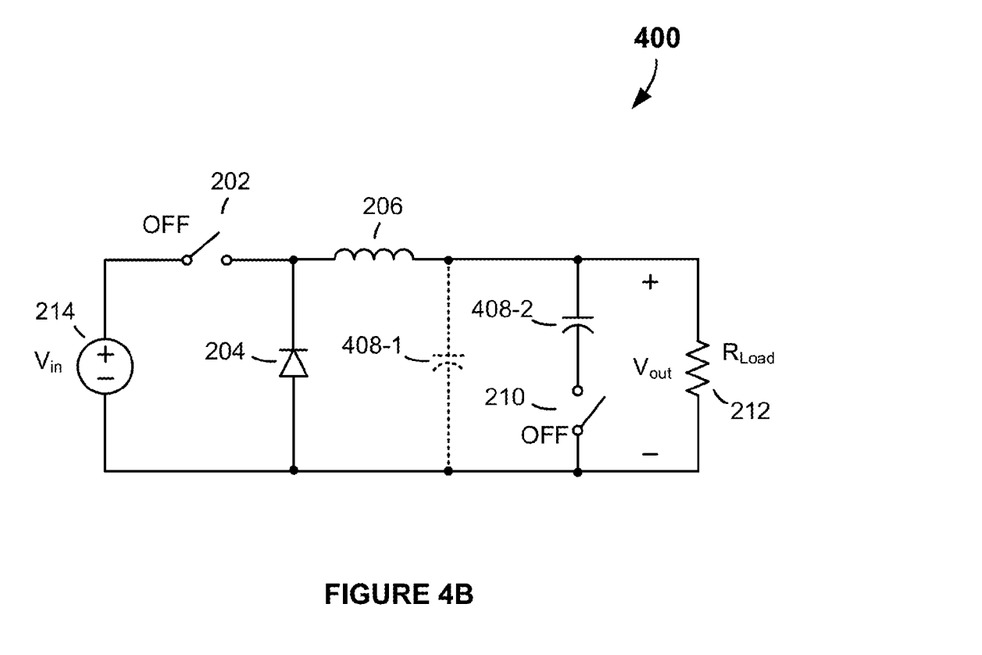

It should be mentioned that in other embodiments of the invention, the output capacitor 208 comprises a plurality of output capacitors connected in parallel, i.e., instead of just a single output capacitor, such that one or more output capacitors of the plurality is/are switched out of the DC-DC converter 200 and electrically isolated upon the second switch 202 opening. (If more than one capacitor is switched out, additional switches may be used to switch out the additional capacitors, as will be understood by those of ordinary skill in the art.) FIGS. 4A and 4B show, for example, a DC-DC converter 400 according to an embodiment of the present invention in an operating state (FIG. 4A) and disabled state (FIG. 4B) having a first output capacitor 408-1 and a second output capacitor 408-2. The second output capacitor 408-2 has a much higher capacitance (although not necessarily) than the first output capacitor 408-1 and is connected in series with the second switch 210. Similar to the DC-DC converter 200 in FIGS. 2A and 2B, the DC-DC converter 400 transitions to the disabled state upon the second switch 210 opening. While the first output capacitor 408-1 remains connected across the load 212 after the second switch 210 is opened, the second output capacitor 408-2 becomes electrically isolated. Energy stored in the second output capacitor is therefore not required to discharge in order to disable the DC-DC converter 400, and transition to the disabled state ensues rapidly.

Figure 5A:
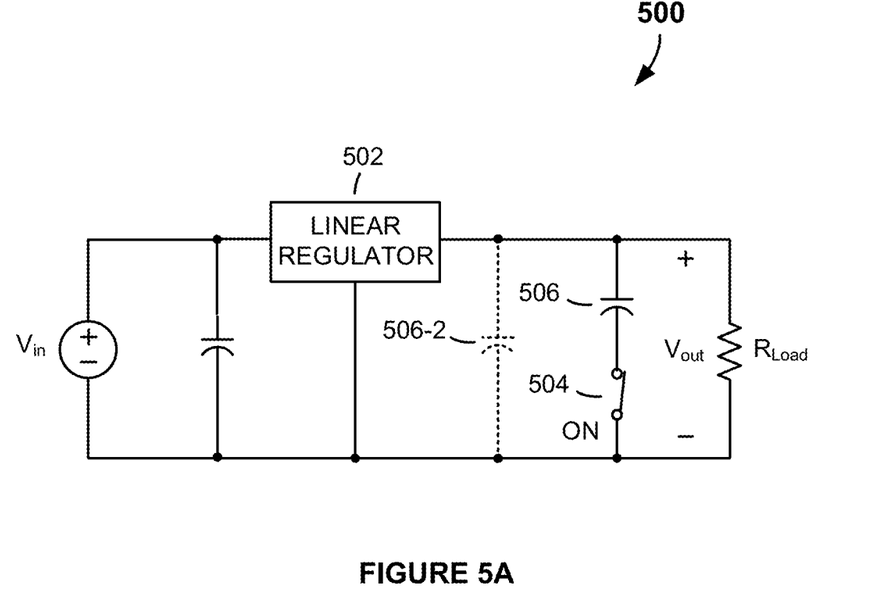
FIGS. 5A and 5B are schematic drawings of a linear-regulator-based DC-DC converter configured in an operating state and disabled state, respectively, according to an embodiment of the invention.
Figure 5B:
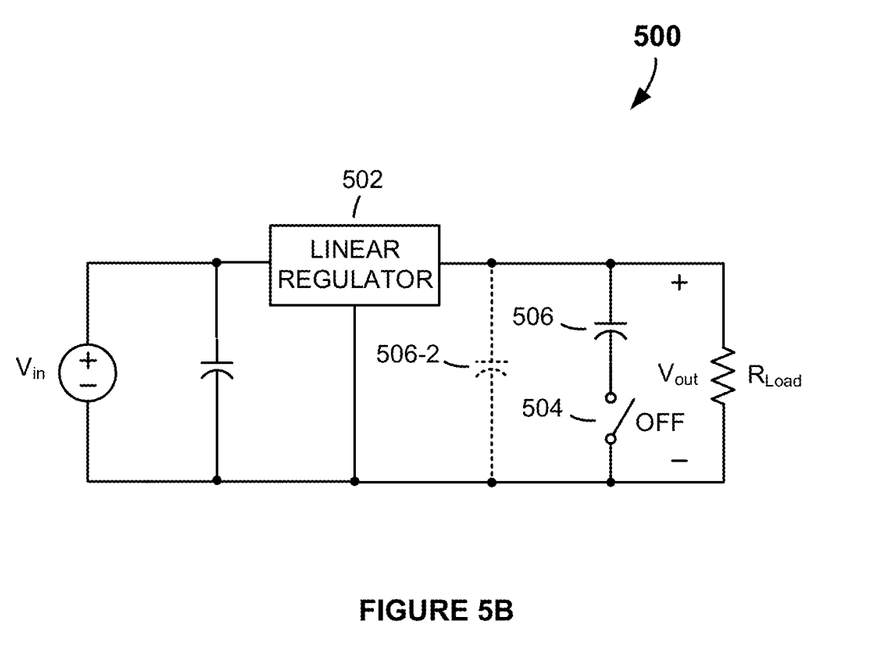

It should also be mentioned that the technique of using the second switch 210 to isolate the output capacitor and facilitate rapid transition times between disabled and operating states can also be used in a linear regulator (e.g., a low-dropout or LDO), i.e., is not limited to switch-mode DC-DC converters. As illustrated in FIGS. 5A and 5B, which are drawings of a DC-DC converter 500 based on a linear regulator 502 according to another embodiment of the invention, a switch 504 is connected in series with output capacitor 506. When the DC-DC converter 500 is in its operating state (FIG. 5A), the switch 504 remains closed and the linear regulator 502 operates to produce a regulated output voltage Vout, similar to as in a conventional linear regulator. However, upon a detected or expected large and abrupt decrease in load current (or based on some other external command independent of load conditions), the switch 504 is opened (FIG. 5B), isolating the output capacitor 506 and allowing the DC-DC converter 500 to transition rapidly to a disabled state. (Note: The output capacitor 506 may alternatively comprise a plurality of output capacitors connected in parallel (similar to as the embodiment of the invention shown in FIGS. 4A and 4B). This alternative configuration is indicated by the second output capacitor 506-2, which is depicted using dotted lines to indicate that its inclusion is an alternative.)

Figure 6A:
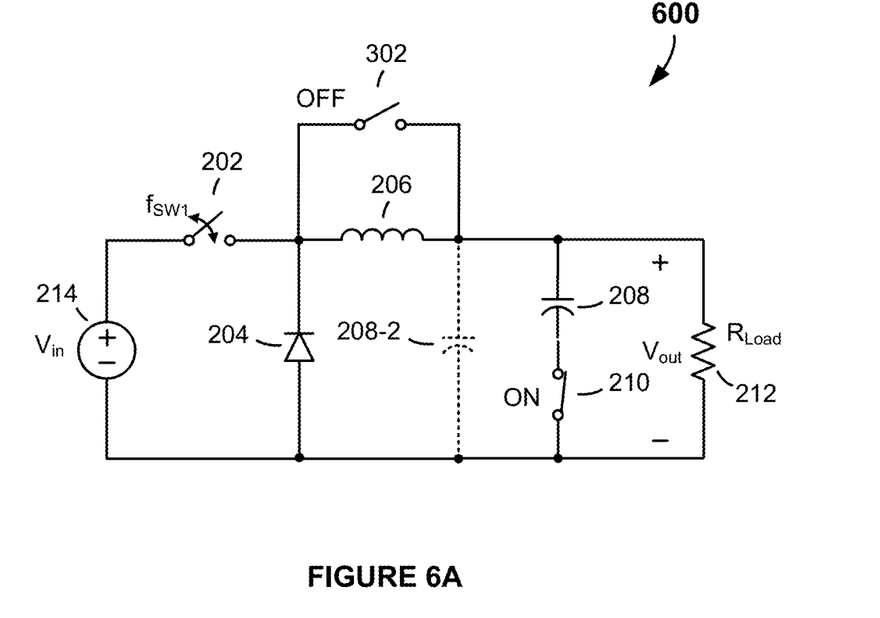
FIGS. 6A and 6B are schematic drawings of a switch-mode DC-DC converter configured in an operating state and disabled state, respectively, according to an embodiment of the invention.
Figure 6B:
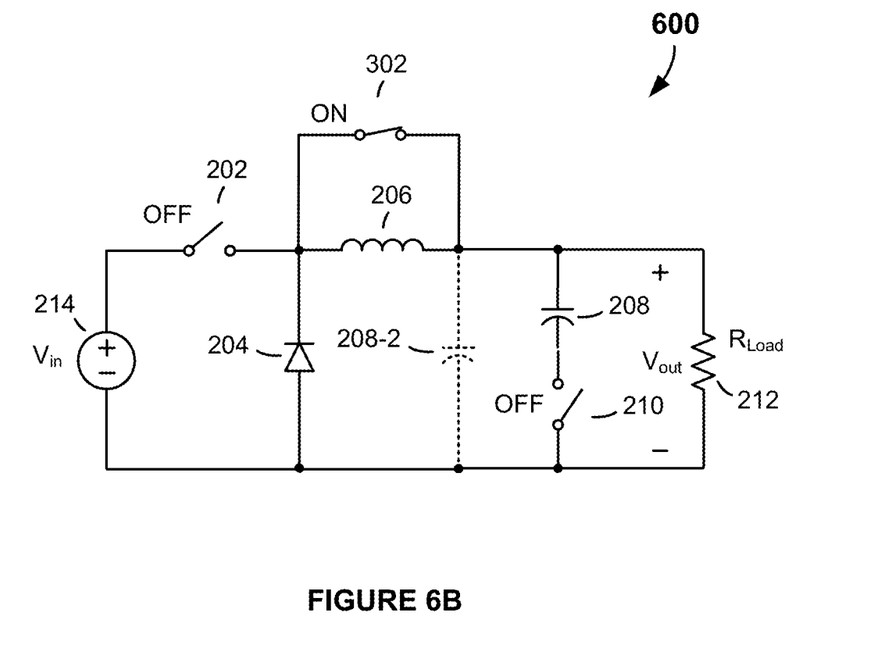

FIGS. 6A and 6B are schematic drawings of a switch-mode DC-DC converter 600 in an operating state and disabled state, respectively, according to another embodiment of the present invention. This embodiment of the invention is similar to the embodiment of the invention shown and described in FIGS. 2A and 2B above and further includes a third switch 302. The third switch 302 is connected across the terminals of the inductor 206. When the switch-mode DC-DC converter 600 is configured in the operating state, as shown in FIG. 6A, the third switch 302 is left open (i.e., remains OFF). Further, similar to the switch-mode DC-DC converter 200 in FIGS. 2A and 2B, the first switch 202 is configured to alternately couple and decouple the DC input power supply 214 to and from the inductor 206 at a rate of $f_{SW1}$ and the second switch 210 is left closed (i.e., remains ON). Accordingly, when in the operating state, the switch-mode DC-DC converter 600 operates similar to a conventional switch-mode DC-DC converter.

When in the disabled state (FIG. 6B), the first switch 202 is left open, rather than being alternately opened and closed, and the second switch 210 is also left open, similar to as the switch-mode DC-DC converter 200 in FIGS. 2A and 2B when in its disabled state. Additionally, the third switch 302 is closed, which causes current otherwise destined for the load 212 to circulate (i.e., loop) through the inductor 206. As in other embodiments of the invention, the first, second and third switches 202, 210 and 302 are controlled by an external power management control system, and are activated based on a detected or expected large and abrupt decrease in load current or in response to an external command independent of load conditions. Diverting the output current so that it loops through the inductor 206 prevents large voltage transients from developing and dropping across the load 212. In effect, opening the second switch 210 and closing the third switch 302 decouples the output filter (inductor 206/output capacitor 208) from the rest of the converter 600 while keeping most of the energy stored in the filter intact. (As in other embodiments of the invention, the output capacitor 208 of the output filter may comprise a plurality of output capacitors connected in parallel, i.e., instead of just a single output capacitor. This alternative configuration is indicated by the second output capacitor 208-2, which is depicted using dotted lines to indicate that its inclusion is an alternative.) The energy stored in the output filter will naturally dissipate by way of resistive losses once the second switch 210 is opened and the third switch 302 is closed. However, if the resistive losses are not too great, any energy that remains at the time the load 212 is reactivated is available to reduce the transition time of the switch-mode DC-DC converter 600 back to the operating state.

Figure 7:
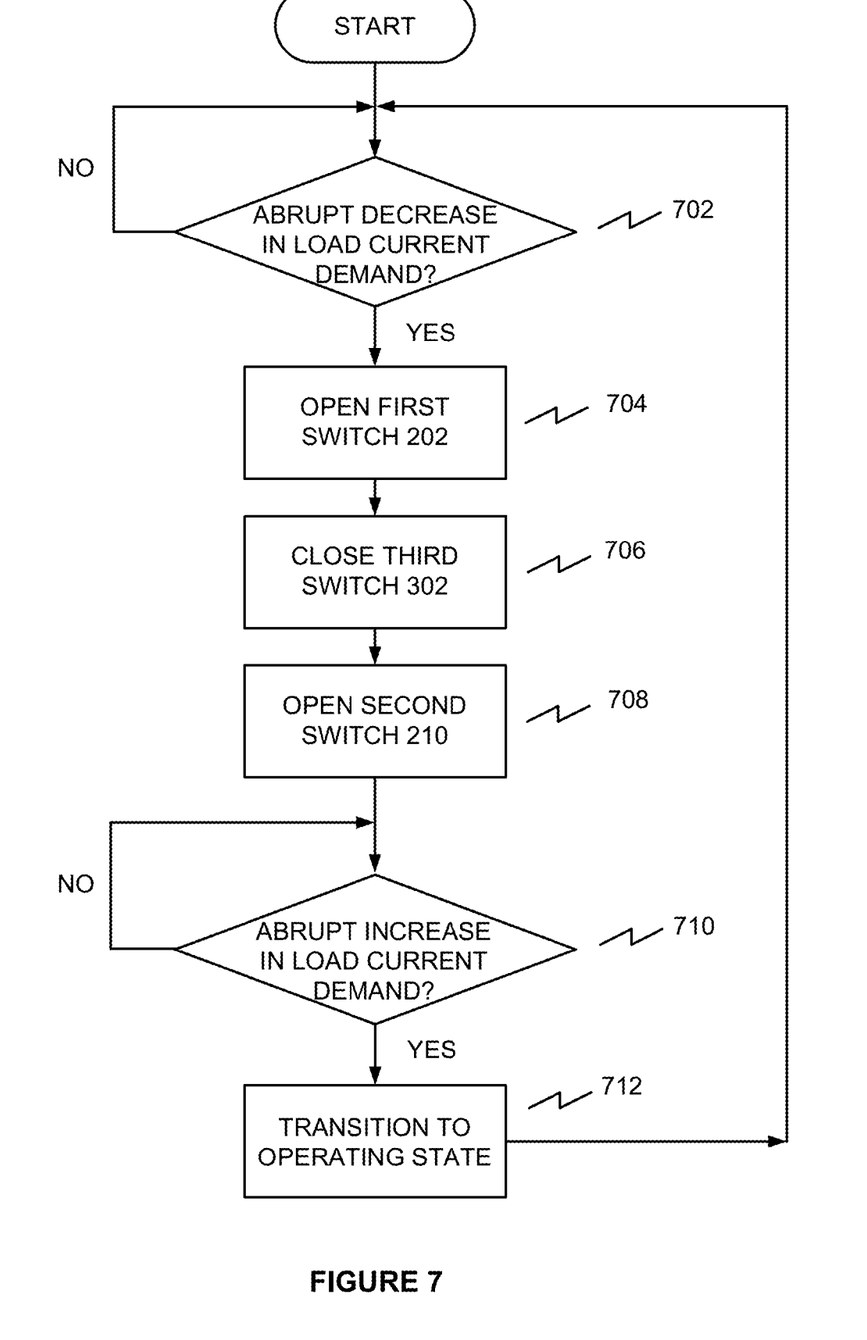
FIG. 7 is a flowchart of a method of the switch-mode DC-DC converter in FIG. 6 transitioning from an operating state in which power is delivered to a load to a disabled state in which power delivery to the load is disabled, according to an embodiment of the present invention.

FIG. 7 is a flowchart illustrating an order in which the first, second and third switches 202, 210 and 302 of the switch-mode DC-DC converter 600 are opened, opened, and closed, respectively, in completing a power supply transition from the operating state to the disabled state, according to one embodiment of the present invention. (It should be emphasized that not all embodiments of the invention follow the order in the flowchart. Accordingly, unless expressly indicated in the claims, the scope of the claimed invention should not be construed as being limited to the order of this specific exemplary embodiment.) The approach illustrated in FIG. 7 is best used in situations where changes in load current demand are wide and happen in a short period of time, such as may occur, for example, in an application in which the load 212 comprises a computer/server in a server farm. While in the operating state, the external power management control system monitors for a large and abrupt decrease in load current demand (or generates a disable command in accordance with an impending expected or planned large and abrupt decrease in load current). When at decision 702 such a load change is detected (or after the disable command is generated), transition of the switch-mode DC-DC converter 600 to the disabled state begins at step 704 by opening the first switch 202. Next, at step 706 the third switch 302 is closed, allowing current to loop through the inductor 206. As explained above, looping the inductor current prevents large voltage transients from developing and dropping across the load 212. Finally, in step 708 the second switch 210 is opened, disconnecting the output capacitor 208 from the load 212. At this point in the process, the switch-mode DC-DC converter 600 is fully disabled and no power delivery is made to the load 212. The switch-mode DC-DC converter 600 remains in this disabled state until at decision 710 the external power management control system detects a large and abrupt increase in load current demand (or generates an enable command in accordance with an impending expected or planned large and abrupt increase in load current demand). Upon detecting a large and abrupt increase in load current demand (or after the enable command is generated), at step 712 the first switch 202 is once again controlled to open and close at a rate $f_{SW1}$, the second switch 210 is closed, and the third switch 302 is opened (not necessarily in that order), allowing the switch-mode DC-DC converter 300 to complete the transition back to the operating state. As discussed above, any energy remaining in the magnetic field of the inductor 206 and/or the electric field of the output capacitor 208 at the time of the load change occurs is available to hasten the transition back to the operating state.

Figure 8:
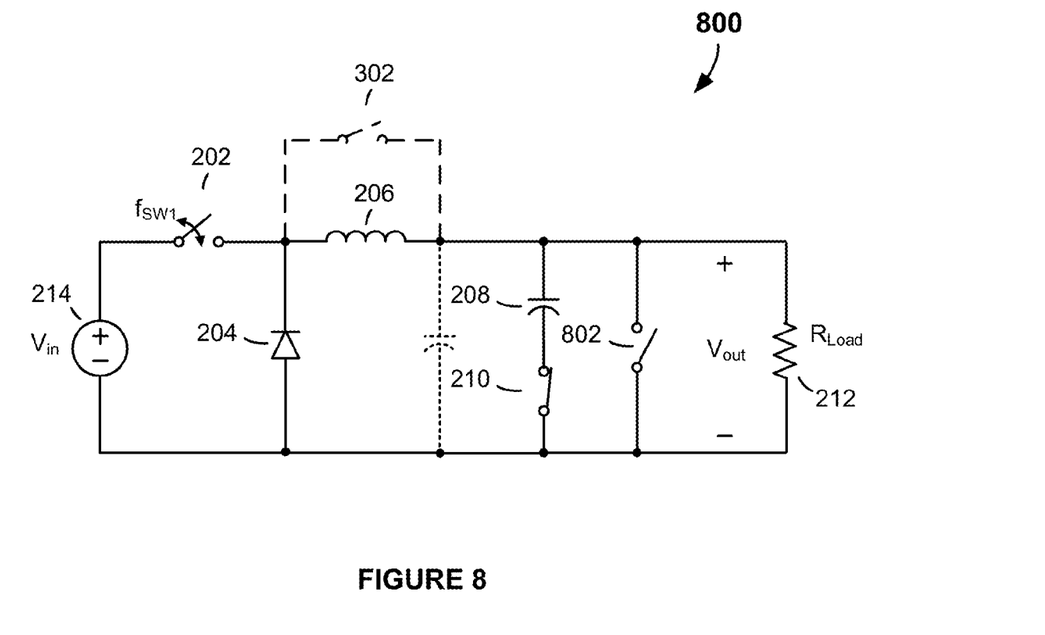
FIG. 8 is a drawing of a switch-mode DC-DC converter in an operating state, according to an embodiment of the present invention.

In some applications it may be necessary or desirable to produce a zero output voltage Vout as soon as possible after a large and abrupt decrease in current demand of the load 212 is detected. This objective can be achieved by configuring a fourth switch 802 (i.e., shunt switch) across the output terminals of the switch-mode DC-DC converter 800, as illustrated in FIG. 8. (The third switch 302 is optional, as indicated by the dashed lines.) When the switch-mode DC-DC converter 800 is in its operating state, as shown in FIG. 8, the fourth switch 802 is open. However, as soon as a large and abrupt decrease in load current is detected or is about to occur (if a large and abrupt decrease in load current is expected or planned), the fourth switch 802 is closed. Once Vout=0 and the switch-mode DC-DC converter 800 is disabled, the fourth switch 802 can then be reopened.

While various embodiments of the present invention have been described, they have been presented by way of example and not limitation. It will be apparent to persons skilled in the relevant art that various changes in form and detail may be made to the exemplary embodiments without departing from the true spirit and scope of the invention. Accordingly, the scope of the invention should not be limited by the specifics of the exemplary embodiments but, instead, should be determined by the appended claims, including the full scope of equivalents to which such claims are entitled.

What is claimed is:

1. A rapid-transition switch-mode direct-current to direct-current (DC-DC) converter for delivering electrical power to a load, comprising:
   an output filter including an inductor and a capacitor;
   a first switch having a first control terminal configured to receive a first ON/OFF switch control signal that causes said first switch to alternately and repeatedly couple and decouple the inductor of said output filter to and from a DC input voltage as power is being delivered to the load and causes said first switch to remain OFF upon and as power to the load is being removed; and
   a second switch coupled in series with said capacitor, said second switch having a second control terminal configured to receive a second ON/OFF switch control signal that causes said second switch to remain ON during times power is being delivered to the load and causes said second switch to turn OFF, electrically isolate said capacitor, and prevent said capacitor from discharging through the load immediately upon and as power delivery to the load is being removed.

2. The rapid-transition switch-mode DC-DC converter of claim 1, further comprising a third switch having a third control terminal configured to receive a third ON/OFF switch control signal that causes said third switch to remain OFF during times power is being delivered to the load and cause said third switch to turn ON and short said inductor immediately upon and as power delivery to the load is being removed.

3. The rapid-transition switch-mode DC-DC converter of claim 1, further comprising a shunt switch coupled across the series connection of said capacitor and said second switch, said shunt switch configured to force an output voltage across the load to zero volts or substantially zero volts.

4. The rapid-transition switch-mode DC-DC converter of claim 1, wherein electrically isolating said capacitor and preventing said capacitor from discharging through the load allows said DC-DC converter to halt power delivery to said load in less than 1 microsecond.

5. A rapid-transition switch-mode direct-current to direct-current (DC-DC) converter for delivering electrical power to a dynamically varying load, comprising:
   a first switch;
   an inductor having a first terminal coupled to said first switch;
   a capacitor having a first terminal coupled to a second terminal of said inductor; and
   a second switch connected in series with said capacitor,
   wherein during times the dynamically varying load is active said first switch alternately and repeatedly couples and decouples the first terminal of said inductor to and from an input power supply and said second switch is closed, and wherein immediately upon and as the dynamically varying load is transitioning from an active state to an inactive state said first and second switches are both configured to be maintained in an open position.

6. The rapid-transition switch-mode DC-DC converter of claim 5, further comprising a third switch in parallel with said inductor configured to remain open during times when the dynamically varying load is active but configured to close and short said inductor upon or shortly prior to the dynamically varying load becoming inactive.

7. The rapid-transition switch-mode DC-DC converter of claim 5, further comprising a shunt switch coupled across said capacitor configured to force an output voltage of the claimed DC-DC converter to zero volts or substantially zero volts upon or shortly prior to said dynamically varying load becoming inactive.

8. The rapid-transition switch-mode DC-DC converter of claim 5, wherein the rapid-transition switch-mode DC-DC converter is configured to transition from an operating state, during which power is being delivered to the dynamically varying load, to a disabled state, during which substantially no power is being delivered to the dynamically varying load, in less than 1 microsecond.

9. A method of rapidly disabling a direct-current to direct-current (DC-DC) converter, comprising:
converting an DC input voltage to an DC output voltage while supplying power to a load; and
disabling the DC-DC converter to halt power delivery to the load,
wherein disabling the DC-DC converter includes electrically isolating and preventing current flow through an output capacitor of the DC-DC converter immediately upon and as the DC-DC converter is being disabled.

10. The method of claim 9, wherein electrically isolating and preventing current flow through the output capacitor includes preventing the output capacitor from discharging through the load immediately upon and as the DC-DC converter is being disabled.

11. The method of claim 10, wherein converting the DC input voltage to the DC output voltage comprises alternately and repeatedly coupling and decoupling the DC input voltage to and from an inductor disposed in an electrical path between an input and an output of the DC-DC converter, and wherein disabling the DC-DC converter further comprises shorting the inductor immediately upon and as the DC-DC converter is being disabled.

12. The method of claim 11, wherein shorting said inductor is initiated just prior to or immediately after electrically isolating said output capacitor.

13. The method of claim 9, wherein disabling the DC-DC converter is initiated upon a detected decrease in load current demand.

14. The method of claim 9, wherein disabling the DC-DC converter is initiated based on an expected or planned decrease in load current demand.

15. The method of claim 9, wherein disabling the DC-DC converter is initiated independent of any change in load current demand.

16. The method of claim 9, further comprising using energy stored in the output capacitor to hasten transition of the DC-DC converter from a disabled state back to an operating state.

17. The method of claim 9, further comprising temporarily shunting output terminals of the DC-DC converter just prior to or immediately upon the DC-DC converter being disabled.

18. The method of claim 9, wherein disabling the DC-DC converter is completed in less than 1 microsecond.

* * * * *